United States Patent [19]

Fujioka et al.

[11] Patent Number: 5,830,264

[45] Date of Patent: Nov. 3, 1998

[54] WATER-BASED RECORDING INK COMPOSITION, AND INK-JET RECORDING PROCESS

[75] Inventors: Masaya Fujioka; Hideto Yamazaki, both of Nagoya; Shunichi Higashiyama, Yotsukaichi, all of Japan

[73] Assignee: Brother Kogyo Kabushiki Kaisha, Nagoya, Japan

[21] Appl. No.: 824,516

[22] Filed: Mar. 26, 1997

[30] Foreign Application Priority Data

Mar. 29, 1996 [JP] Japan .................................. 8-076051
Apr. 1, 1996 [JP] Japan .................................. 8-078875

[51] Int. Cl.[6] .................................................. C09D 11/02
[52] U.S. Cl. ...................................... 106/31.43; 106/31.58
[58] Field of Search ............................... 106/31.58, 31.43

[56] References Cited

U.S. PATENT DOCUMENTS

| 5,016,028 | 5/1991 | Temple ................................. 346/140 R |
| 5,389,132 | 2/1995 | Davulcu et al. ...................... 106/31.58 |
| 5,534,050 | 7/1996 | Gundlach ............................. 106/31.58 |
| 5,616,174 | 4/1997 | Kanaya et al. ....................... 106/31.58 |
| 5,658,376 | 8/1997 | Noguchi et al. ..................... 106/31.43 |

FOREIGN PATENT DOCUMENTS

| 62-21033 | 5/1987 | Japan . |
| 2-150355 | 6/1990 | Japan . |

*Primary Examiner*—Helene Klemanski
*Attorney, Agent, or Firm*—Oliff & Berridge, PLC

[57] ABSTRACT

An ink composition comprises a dye, water, at least one of a polyhydric alcohol and an alkyl ether of a polyhydric alcohol, and an organic weakly basic compound, and has a pH range of 8 to 10.

40 Claims, No Drawings

5,830,264

WATER-BASED RECORDING INK COMPOSITION, AND INK-JET RECORDING PROCESS

BACKGROUND OF THE INVENTION

1. Field of the Invention

This invention relates to a water-based recording ink composition suited for ink-jet recording, and an ink-jet recording process making use of the ink composition.

2. Description of the Related Art

Ink-jet recording is a system in which ink droplets are formed by ink ejection methods of various types (e.g., a system utilizing electrostatic attraction, a system in which mechanical vibration or displacement is imparted to ink by the use of a piezoelectric device, and a system in which ink is heated to cause it to bubble and a pressure produced when it bubbles is utilized), and a part or the whole of them is caused to adhere to recording mediums such as paper to make a record.

As ink compositions used in such ink-jet recording systems, those prepared by dissolving or dispersing a water-soluble dye or a pigment in water or a liquid medium comprising water and a water-soluble organic solvent are known and put into use. Such ink compositions are required to have various performances most suited for the ink-jet recording. For example, they are required to cause no precipitation or aggregation even when unused for a long period of time, to cause no clogging at nozzles and in ink channels of the head of an ink-jet printer and to ensure good print quality. In particular, the performance most required is the liquid stability that the ink composition does not cause clogging of, and deposits at, nozzles and ink channels of the ink-jet printer head when recording is performed using the ink composition and also when the recording is not performed over a long period of time.

In comparison between dyes and pigments, the pigments stand dispersed in ink mediums without dissolving, while the dyes stand completely dissolved in ink mediums, and hence dye ink compositions more tend to cause no clogging at nozzles and in ink channels of the ink-jet printer head and also have much better liquid stability than pigment ink compositions. For such reasons, inks for ink-jet printers are mostly dye ink compositions. Among such dye ink compositions, water-based dye ink compositions in which dyes are dissolved in water are prevailing. Such water-based dye ink compositions are comprised of water-soluble dyes having various chemical structure which are dissolved in water or mixed solvents of water and water-soluble organic solvents, and various additives optionally added, and are widely put into use at present. Especially in order to achieve the optimum performances and properties stated above, in many instances, inorganic salts such as KOH and NaOH, which are strongly basic, are added or inorganic salt components having a buffer action are added to adjust the pH.

However, in such water-based dye ink compositions, the inorganic salt components tend to become deposited at the nozzles of the ink-jet printer head to cause clogging. Also when ink compositions are used over a long period time, such ink compositions have so poor a liquid stability that solid matter may become deposited to cause clogging at nozzles and in ink channels of the ink-jet printer head. Thus, such ink compositions can not well endure their use as inks for ink-jet recording. On the other hand, if ink compositions are strongly alkaline as liquid properties, they may cause deformation of members used in ink-jet recording apparatus, in particular, members in which organic materials are used, or the organic materials constituting the members may dissolve into inks. Because of these difficulties, such ink compositions containing inorganic salt components are not preferable.

Japanese Patent Publication No.62-21033 discloses an ink composition for ink-jet recording using an organic salt component in place of an inorganic salt component. This publication, however, fails to teach that a pH of the ink composition should be adjusted within an appropriate range. Thus, when a pH of such an ink composition is too low, solid matter may readily become deposited therein to cause clogging at nozzles and in ink channels of the ink-jet printer head. On the other hand, when a pH thereof is too high, members used in ink-jet recording apparatus may be deformed.

SUMMARY OF THE INVENTION

The present invention was made in order to solve the above problems. Accordingly, an object of the present invention is to provide a water-based recording ink composition having a superior liquid stability and an ink-jet recording process that may cause no troubles such as clogging.

To achieve these objects, the present invention provides a water-based recording ink composition comprising a dye, water, at least one of a polyhydric alcohol and an alkyl ether of a polyhydric alcohol, and an organic weakly basic compound, and having a pH range of 8 to 10.

The present invention also provides a water-based recording ink composition comprising a dye, water, a polyhydric alcohol, an alkyl ether of a polyhydric alcohol and an organic weakly basic compound, and having a pH range of 8 to 10.

The present invention further provides an ink-jet recording process comprising jetting a water-based recording ink composition to a recording medium in the form of droplets to make a record; the ink composition comprising a dye, water, at least one of a polyhydric alcohol and an alkyl ether of a polyhydric alcohol, and an organic weakly basic compound, and having a pH range of 8 to 10.

These and other objects, features and advantages of the present invention are described in or will become apparent from the following detailed description of the preferred embodiments.

DESCRIPTION OF THE PREFERRED EMBODIMENTS

The present invention will be described below in detail.

The water-based recording ink composition of the present invention is characterized by having a dye, water, at least one of a polyhydric alcohol and an alkyl ether of a polyhydric alcohol, and an organic weakly basic compound, and having a pH range of 8 to 10. The ink composition constituted in this way brings about an improvement in print image quality and makes deposits hardly occur, when used in recording.

Components that make up the ink composition of the present invention will be described below.

The dye used in the present invention may include water-soluble dyes as typified by direct dyes, acid dyes and reactive dyes, any of which may be used. In particular, as those preferable for ink compositions used in the ink-jet recording systems and satisfying sharpness, water-solubility, stability, light-fastness and other required performances, the dye includes, for example, C.I. Direct Black 17, 19, 32, 51, 71, 108, 146, 154, 168; C.I. Direct Blue 6, 22, 25, 71, 86, 90, 106, 199; C.I. Direct Red 1, 4, 17, 28, 83, 227; C.I. Direct Yellow 12, 24, 26, 86, 98, 132, 142; C.I. Direct Orange 34, 39, 44, 46, 60; C.I. Direct Violet 47, 48; C.I. Direct Brown 109; C.I. Direct Green 59; C.I. Acid Black 2, 7, 24, 26, 31, 52, 63, 112, 118; C.I. Acid Blue 9, 22, 40, 59, 93, 102, 104, 117, 120, 167, 229, 234; C.I. Acid Red 1, 6, 32, 37, 51, 52, 80, 85, 87, 92, 94, 115, 180, 249, 256, 289, 315, 317; C.I. Acid Yellow 11, 17, 23, 25, 29, 42, 61, 71; C.I. Acid Orange 7, 19; C.I. Acid Violet 49; and C.I. Food Black 1, 2, any of which may be used alone or in combination of two or more.

The foregoing examples of the dye are examples particularly preferred for the ink composition usable in the recording process of the present invention. In the present invention, examples are by no means limited to these dyes.

In conventional ink compositions, such water-soluble dyes are commonly used in such a proportion that the dye holds about 0.1% to 10% by weight in the ink composition. In the present invention, the dye may be used within such a range as a matter of course, and may also be used in an amount more than that conventionally applied. Even when used in such an amount, the ink composition can be stable and may cause no deposits.

In the present invention, a mixed solvent of water and at least one of a polyhydric alcohol and an alkyl ether of a polyhydric alcohol is used as a solvent. Of these, the polyhydric alcohol has an ink-dry preventive effect. The alkyl ether of a polyhydric alcohol not only has an ink-dry preventive effect but also contributes to the achievement of quick drying and a good print quality because of its excellent action of permeation into recording paper or the like. As the water, it is preferable to use not city water containing various ions but deionized water (inclusive of pure water).

As the polyhydric alcohol described above, it is preferable to use those having an ink-dry preventive (or wetting) effect and hence capable of improving the liquid stability of the ink composition.

As examples of the polyhydric alcohol, it may include polyalkylene glycols such as polyethylene glycol and polypropylene glycol; alkylene glycols such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-heptanediol, and hexylene glycol; and glycerol. Any of these may be used alone or in combination of two or more.

As the alkyl ether of a polyhydric alcohol, it is preferable to use those not only having an ink-dry preventive effect but also contributing to the achievement of quick drying and a good print quality because of its excellent action of permeation.

As examples of the alkyl ether of a polyhydric alcohol, it may include diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether. Any of these may be used alone or in combination of two or more.

In the case when the polyhydric alcohol is contained in the ink composition, it may be in an amount usually ranging from 5% to 95% by weight, preferably from 10% to 80% by weight, and more preferably from 10% to 50% by weight, based on the total weight of the ink composition.

In the case when the alkyl ether of a polyhydric alcohol is contained in the ink composition, it may be in an amount ranging from 1% to 50% by weight, preferably from 3% to 25% by weight, and more preferably from 5% to 15% by weight, based on the total weight of the ink composition. Here, the content of the water may be determined within a vast range, depending on the type of component of the above solvent, the composition thereof and the desired properties of ink, and may be within the range of usually from 10% to 95% by weight based on the total weight of the ink composition.

In the case when both of the polyhydric alcohol and the alkyl ether of a polyhydric alcohol are contained, it is preferable that the former is contained in an amount greater than the content of the latter. In more detail, the polyhydric alcohol is contained in an amount of from preferably 5% to 95% by weight, more preferably 10% to 80% by weight, and much more preferably 10% to 50% by weight, based on the total weight of the ink composition. Correspondingly, the alkyl ether of a polyhydric alcohol is contained in an amount of from preferably 1% to 50% by weight, more preferably 3% to 25% by weight, and much more preferably 5% to 15% by weight, based on the total weight of the ink composition. In addition, the total content of both of the polyhydric alcohol and the alkyl ether of a polyhydric alcohol is preferably 6% to 95% by weight, more preferably 10% to 80% by weight, much more preferably 10% to 50% by weight, based on the total weight of the ink composition.

The pH adjuster used in the present invention is an organic weakly basic compound. The organic weakly basic compound is different from other inorganic salts commonly used as pH adjusters, and brings about an advantage that the compound itself does not solidify at the nozzles of the ink-jet printer head to hardly cause clogging.

The organic weakly basic compound may preferably include alcohol amine derivatives which are liquid at room temperature, and 2-amino-1,3-propanediol derivatives.

The alcohol amine derivatives or the 2-amino-1,3-propanediol derivatives are contained in an amount of from preferably 0.03% to 2% by weight based on the total weight of the ink composition.

The alcohol amine derivatives which are liquid at room temperature can readily adjust the pH within the range of from 8 to 10 when added in an appropriate quantity, and can not turn into deposits by themselves. Thus, any pH changes can be kept minimum even after long-term storage, promising a good liquid stability. Of the alcohol amine derivatives, triethanolamine is particularly preferred. The triethanolamine can readily adjust the pH within the range of from 8 to 10 when added in an appropriate quantity, has a low volatility, is chemically stable and may very hardly cause deposition.

The 2-amino-1,3-propanediol derivatives can readily adjust the pH within the range of from 8 to 10 when added in an appropriate quantity, have a low volatility, can keep pH changes minimum even after long-term storage, and may hardly cause deposition. Of the 2-amino-1,3-propanediol derivatives, 2-aminomethyl-1,3-propanediol or 2-amino-2-hydroxymethyl-1,3-propanediol is particularly preferred. The 2-aminomethyl-1,3-propanediol or 2-amino-2-hydroxymethyl-1,3-propanediol can readily adjust the pH within the range of from 8 to 10 when added in an appropriate quantity, and may very hardly cause deposition.

In the present invention, the pH of the ink composition is limited to 8 to 10. If the pH is less than 8, the dye tends to become deposited when the ink composition is stored for a long period to cause clogging of nozzles and ink channels of the ink-jet printer head. If on the other hand the pH is more than 10, members constituting an ink-jet recording apparatus, in particular, members made from organic materials, may deform or the organic materials constituting the members may dissolve into inks, or such pH is not preferable in view of the safety to human bodies because of a strong alkalinity. The amount of the organic weakly basic compound to be added may be appropriately determined in accordance with the acidity of the dye used.

The ink composition of the present invention is basically made up as described above. Besides, various conventionally known additives such as dispersants, surface active agents, viscosity modifiers, surface tension modifiers and antifungal agents may be optionally added. For example, viscosity modifiers such as polyvinyl alcohol, celluloses and water-soluble resins, surface active agents of various types such as cationic, and anionic and nonionic types may be added. When an ink composition is prepared which is used in an ink-jet recording process of the type a recording solution is charged, a specific resistance modifier including inorganic salts such as ammonium chloride is added.

The water-based recording ink composition of the present invention as described above can be produce by mixing, with mechanical stirring, the above essential components and the optional components added as occasion calls, and filtering the resulting mixture with a membrane filter or the like to remove insoluble matter.

The water-based recording ink composition of the present invention is useful as water-based recording inks used in ink-jet recording processes of various types in which the water-based recording ink composition is jetted to a recording medium in the form of droplets to make a record. It is especially suited for an ink-jet recording process in which the water-based recording ink composition is jetted in the form of droplets by utilizing the vibration of a piezoelectric device, and also can be expected to be used in an ink-jet recording process in which the water-based recording ink composition is jetted in the form of droplets by utilizing the action of heat energy.

Thus, in the ink-jet recording process employing the water-based recording ink composition of the present invention, clogging at the nozzles or ink channels of the ink-jet printer head may hardly occur, and also the members, which, in particular, are made from organic materials, constituting the ink-jet recording apparatus can be free from attack by ink components. Especially when the alcohol amine derivative which is liquid at room temperature (in particular, triethanolamine) or the 2-amino-1,3-propanediol derivative (in particular, 2-aminomethyl-1,3-propanediol or 2-amino-2-hydroxymethyl-1,3-propanediol) is used as the organic weakly basic compound, not only the members, in particular, organic materials, used in the ink-jet recording apparatus can be free from attack by ink components, but also the clogging at the nozzles or ink channels of the ink-jet printer head may more hardly occur. In particular, no clogging may occur even when the ink composition is used after long-term storage.

EXAMPLES

The present invention will be described below in greater detail by giving Examples and Comparative Examples. The present invention is by no means limited to these.

Example 1

To 62.9 parts by weight of pure water, 0.1 part by weight of triethanolamine, 2 parts by weight of a yellow dye DAIWA IJ YELLOW 205H (trade name; available from Daiwa Chemical Co., Ltd.), 10 parts by weight of diethylene glycol and 10 parts by weight of diethylene glycol monobutyl ether were added, and the mixture was stirred for 30 minutes, followed by filtration with a membrane filter of 0.7 $\mu$m in pore diameter to obtain a yellow ink composition. The pH of this yellow ink composition was measured to find that it was 9.3.

This yellow ink composition was examined on the following T1 to T4, and good results were obtained in all items.

(T1) Long-term stability: The ink composition was hermetically enclosed in a heat-resistant glass bottle, and stored at $-30°$ C. or $60°$ C. for 6 months. Even after such storage, deposition of insoluble matter was not seen, and changes in color tone was also little seen. With regard to liquid properties, the pH slightly decreased after both the storage at $-30°$ C. and that at $60°$ C., but within the range of from 8.5 to 9.0 in either instance. Almost no changes were seen in viscosity, surface tension, conductivity, density and so forth.

(T2) Print quality: Using a shear mode type ink-jet recording head disclosed in Japanese Patent Application Laid-open No. 2-150355, characters and solid images were printed on plain paper and coated paper of various types in an environment of normal temperature and normal humidity. The printed characters and solid images obtained both dried within 5 seconds, and good prints almost free of feathering and so forth were obtained.

(T3) Ejection stability: Using the shear mode type ink-jet recording head disclosed in Japanese Patent Application Laid-open No. 2-150355, the ink composition was continuously ejected in an atmosphere of $5°$ C. to $20°$ C. or $40°$ C., for 24 hours for each. Always stable, high-quality recording was performed in all atmospheres.

(T4) Ejection response: Using the shear mode type ink-jet recording head disclosed in Japanese Patent Application Laid-open No. 2-150355, intermittent ejection at intervals of 1 minute and ejection after leaving for 2 months were examined. In both instances, no clogging occurred at the nozzles or ink channels of the ink-jet printer head, and stable and uniform recording was performed.

Example 2

To 77.9 parts by weight of pure water, 0.1 part by weight of diethanolamine, 2 parts by weight of a yellow dye DAIWA IJ YELLOW 205H (trade name; available from Daiwa Chemical Co., Ltd.), 15 parts by weight of glycerol and 5 parts by weight of triethylene glycol monomethyl ether were added, and a yellow ink composition was obtained in the same manner as in Example 1. The pH of this yellow ink composition was measured to find that it was 9.1.

This yellow ink composition was examined in the same manner as in Example 1, and good results were obtained like those in Example 1. In the evaluation of long-term stability in T1, the pH was kept within the range of from 8.0 to 8.5 after both the storage at $-30°$ C. and that at $60°$ C.

Example 3

To 55.95 parts by weight of pure water, 0.05 part by weight of triethanolamine, 2 parts by weight of a cyan dye DAIWA IJ BLUE 319H (trade name; available from Daiwa Chemical Co., Ltd.), 30 parts by weight of polyethylene glycerol (average molecular weight: 200) and 12 parts by weight of diethylene glycol monobutyl ether were added, and a cyan ink composition was obtained in the same manner as in Example 1. The pH of this yellow ink composition was measured to find that it was 8.6.

This yellow ink composition was examined in the same manner as in Example 1, and good results were obtained like those in Example 1. In the evaluation of long-term stability in T1, the pH was kept within the range of from 8 to 8.5 after both the storage at −30° C. and that at 60° C.

Comparative Example 1

To 77.99 parts by weight of pure water, 0.01 part by weight of triethanolamine, 2 parts by weight of a yellow dye DAIWA IJ YELLOW 205H (trade name; available from Daiwa Chemical Co., Ltd.) and 20 parts by weight of diethylene glycol were added, and a yellow ink composition was obtained in the same manner as in Example 1. The pH of this yellow ink composition was measured to find that it was 7.8.

This yellow ink composition was examined in the same manner as in Example 1. As a result, in T1, deposition of solid matter was seen after both the storage at −30° C. and that at 60° C. In T2, it took 10 seconds or more for the prints to dry, and feathering like whiskers was seen at character areas. In T4, the ink often did not ejected. The head nozzles of the ink-jet printer were observed using an optical microscope to confirm that solid matter was seen to have adhered.

Comparative Example 2

The procedure of Example 1 was repeated to obtain a yellow ink composition, except that the triethanolamine was not added. As a result, the pH of the ink composition was 5.3.

This yellow ink composition was examined in the same manner as in Example 1. As a result, in T1, deposition of solid matter was seen after both the storage at −30° C. and that at 60° C. In T3 and T4, the ink often did not ejected. The head nozzles of the ink-jet printer were observed using an optical microscope to confirm that solid matter was seen to have adhered.

Comparative Example 3

To 68 parts by weight of an aqueous KOH solution prepared so as to be in a concentration of 2×10−5 mol/l, 2 parts by weight of a yellow dye DAIWA IJ YELLOW 205H (trade name; available from Daiwa Chemical Co., Ltd.), 20 parts by weight of diethylene glycol and 10 parts by weight of diethylene glycol monobutyl ether were added, and a yellow ink composition was obtained in the same manner as in Example 1. The pH of this yellow ink composition was measured to find that it was 9.0.

This ink composition was examined in the same manner as in Example 1. As a result, in T1, the pH became less than 8 after both the storage at −30° C. and that at 60° C., and deposition of solid matter was seen in both instances. In T3 and T4, the ink often did not ejected. The head nozzles of the ink-jet printer were observed using an optical microscope to confirm that solid matter was seen to have adhered.

In the ink compositions of Examples 1 to 3, which showed good long-term storage stability and ejection stability, a superior print quality and also a good ejection response, the ink composition contained the dye, the polyhydric alcohol, the alkyl ether of a polyhydric alcohol and the organic weakly basic compound and the pH of the ink composition was adjusted to 8 to 10 in all the cases.

On the other hand, in the ink compositions of Comparative Examples 1 to 3, which showed inferior long-term storage stability, ejection stability, print quality and ejection response, the ink composition did not fulfill the above conditions in all the cases.

Example 4

To 72.92 parts by weight of pure water, 0.08 part by weight of 2-aminomethyl-1,3-propanediol, 2 parts by weight of a yellow dye DAIWA IJ YELLOW 205H (trade name; available from Daiwa Chemical Co., Ltd.) and 25 parts by weight of diethylene glycol were added, and the mixture was stirred for 30 minutes, followed by filtration with a membrane filter of 0.7 μm in pore diameter to obtain a yellow ink composition. The pH of this yellow ink composition was measured to find that it was 8.6.

This yellow ink composition was examined on the T1, T3 and T4, and, like Example 1, good results were obtained in all items. In the evaluation of long-term stability in T1, the pH was kept within the range of from 8 to 8.5 after both the storage at −30° C. and that at 60° C.

Example 5

To 85.96 parts by weight of pure water, 0.04 part by weight of 2-amino-2-hydroxymethyl-1,3-propanediol, 2 parts by weight of a yellow dye DAIWA IJ YELLOW 205H (trade name; available from Daiwa Chemical Co., Ltd.) and 12 parts by weight of triethylene glycol monomethyl ether were added, and a yellow ink composition was obtained in the same manner as in Example 4. The pH of this yellow ink composition was measured to find that it was 8.3.

This yellow ink composition was examined in the same manner as in Example 4, and good results were obtained like those in Example 4. In the evaluation of long-term stability in T1, the pH was kept within the range of from 8 to 8.2 after both the storage at −30° C. and that at 60° C.

Example 6

To 55.88 parts by weight of pure water, 0.12 part by weight of 2-amino-2-hydroxymethyl-1,3-propanediol, 2 parts by weight of a cyan dye DAIWA IJ BLUE 319H (trade name; available from Daiwa Chemical Co., Ltd.), 30 parts by weight of polyethylene glycerol (average molecular weight: 200) and 12 parts by weight of diethylene glycol monobutyl ether were added, and a cyan ink composition was obtained in the same manner as in Example 4. The pH of this yellow ink composition was measured to find that it was 9.5.

This yellow ink composition was examined in the same manner as in Example 4, and good results were obtained like those in Example 4. In the evaluation of long-term stability in T1, the pH was kept within the range of from 9 to 9.3 after both the storage at −30° C. and that at 60° C.

Comparative Example 4

To 77.99 parts by weight of pure water, 0.01 part by weight of 2-aminomethyl-1,3-propanediol, 2 parts by weight of a yellow dye DAIWA IJ YELLOW 205H (trade name; available from Daiwa Chemical Co., Ltd.) and 20 parts by weight of diethylene glycol were added, and a yellow ink composition was obtained in the same manner as in Example 4. The pH of this yellow ink composition was measured to find that it was 7.8.

This yellow ink composition was examined in the same manner as in Example 4. As a result, in T1, deposition of solid matter was seen after both the storage at −30° C. and that at 60° C. In T4, the ink often did not ejected. The head nozzles of the ink-jet printer were observed using an optical microscope to confirm that solid matter was seen to have adhered.

Comparative Example 5

The procedure of Example 4 was repeated to obtain a yellow ink composition, except that the 2-aminomethyl-1, 3-propanediol was not added. As a result, the pH of the ink composition was 5.3.

This yellow ink composition was examined in the same manner as in Example 4. As a result, in T1, deposition of solid matter was seen after both the storage at −30° C. and that at 60° C. In T3 and T4, the ink often did not ejected. The head nozzles of the ink-jet printer were observed using an optical microscope to confirm that solid matter was seen to have adhered.

Comparative Example 6

To 78 parts by weight of an aqueous KOH solution prepared so as to be in a concentration of 2×10−5 mol/l, 2 parts by weight of a yellow dye DAIWA IJ YELLOW 205H (trade name; available from Daiwa Chemical Co., Ltd.) and 20 parts by weight of diethylene glycol were added, and a yellow ink composition was obtained in the same manner as in Example 4. The pH of this yellow ink composition was measured to find that it was 9.0.

This ink composition was examined in the same manner as in Example 4. As a result, in T1, the pH became less than 8 after both the storage at −30° C. and that at 60° C., and deposition of solid matter was seen in both instances. In T3 and T4, the ink often did not ejected. The head nozzles of the ink-jet printer were observed using an optical microscope to confirm that solid matter was seen to have adhered.

Comparative Example 7

To 97.92 parts by weight of pure water, 0.08 part by weight of 2-aminomethyl-1,3-propanediol and 2 parts by weight of a yellow dye DAIWA IJ YELLOW 205H (trade name; available from Daiwa Chemical Co., Ltd.) were added, and a yellow ink composition was obtained in the same manner as in Example 4. The pH of this yellow ink composition was measured to find that it was 8.8.

This yellow ink composition was examined in the same manner as in Example 4. As a result, in T1, the pH was kept at 8 or more after both the storage at −30° C. and that at 60° C., but in T3 and T4, the ink often did not ejected, or ejected unstably.

In the ink compositions of Examples 4 to 6, which showed good long-term storage stability and ejection stability and also a good ejection response, the ink composition contained the dye, the polyhydric alcohol or the alkyl ether of a polyhydric alcohol and the organic weakly basic compound and the pH of the ink composition was adjusted to 8 to 10 in all the cases.

On the other hand, in the ink compositions of Comparative Examples 4 to 7, which showed inferior long-term storage stability, ejection stability and ejection response, the ink composition did not fulfill the above conditions in all the cases.

The entire disclosure of Japanese Patent Applications No.8-76051 filed on Mar. 29, 1996 and No.8-78875 filed on Apr. 1, 1996 including specifications, claims and summaries are incorporated herein by reference in their entirety.

What is claimed is:

1. A water-based recording ink composition comprising a dye, water, at least one of a polyhydric alcohol and an alkyl ether of a polyhydric alcohol, and an organic weakly basic compound, and having a pH range of 8 to 10, wherein
said organic weakly basic compound is a 2-amino-1,3-propanediol derivative having no unsubstituted alkyl group at its 2 position.

2. The water-based recording ink composition according to claim 1, wherein said organic weakly basic compound is an alcohol amine derivative which is liquid at room temperature.

3. The water-based recording ink composition according to claim 2, wherein said alcohol amine derivative is contained in an amount of from 0.03% to 2% by weight based on the total weight of the ink composition.

4. The water-based recording ink composition according to claim 2, wherein said alcohol amine derivative which is liquid at room temperature is triethanolamine.

5. The water-based recording ink composition according to claim 1, wherein said 2-amino-1,3-propanediol derivative is contained in an amount of from 0.03% to 2% by weight based on the total weight of the ink composition.

6. The water-based recording ink composition according to claim 1, wherein said 2-amino-1,3-propanediol derivative is 2-aminomethyl-1,3-propanediol or 2-amino-2-hydroxymethyl-1,3-propanediol.

7. The water-based recording ink composition according to claim 1, wherein said polyhydric alcohol is selected from the group consisting of polyethylene glycol, polypropylene glycol, ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-heptanediol, hexylene glycol, and glycerol.

8. The water-based recording ink composition according to claim 1, wherein said alkyl ether of a polyhydric alcohol is selected from the group consisting of diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether.

9. The water-based recording ink composition according to claim 1, wherein said polyhydric alcohol is contained in an amount of from 5% by weight to 95% by weight based on the total weight of the ink composition.

10. The water-based recording ink composition according to claim 1, wherein said alkyl ether of a polyhydric alcohol is contained in an amount of from 1% by weight to 50% by weight based on the total weight of the ink composition.

11. The water-based recording ink composition according to claim 1, wherein said water is deionized water.

12. A water-based recording ink composition comprising a dye, water, a polyhydric alcohol, an alkyl ether of a polyhydric alcohol and an organic weakly basic compound, and having a pH range of 8 to 10, wherein
said organic weakly basic compound is a 2-amino-1,3-propanediol derivative having no unsubstituted alkyl group at its 2 position.

13. The water-based recording ink composition according to claim 12, wherein said organic weakly basic compound is an alcohol amine derivative which is liquid at room temperature.

14. The water-based recording ink composition according to claim 13, wherein said alcohol amine derivative is contained in an amount of from 0.03% to 2% by weight based on the total weight of the ink composition.

15. The water-based recording ink composition according to claim 13, wherein said alcohol amine derivative which is liquid at room temperature is triethanolamine.

16. The water-based recording ink composition according to claim 12, wherein said 2-amino-1,3-propanediol derivative is contained in an amount of from 0.03% to 2% by weight based on the total weight of the ink composition.

17. The water-based recording ink composition according to claim 12, wherein said 2-amino-1,3-propanediol derivative is 2-aminomethyl-1,3-propanediol or 2-amino-2-hydroxymethyl-1,3-propanediol.

18. The water-based recording ink composition according to claim 12, wherein said polyhydric alcohol is selected from the group consisting of polyethylene glycol, polypropylene glycol, ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-heptanediol, hexylene glycol, and glycerol.

19. The water-based recording ink composition according to claim 12, wherein said alkyl ether of a polyhydric alcohol is selected from the group consisting of diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether.

20. The water-based recording ink composition according to claim 12, wherein said polyhydric alcohol is contained in an amount of from 5% by weight to 95% by weight based on the total weight of the ink composition.

21. The water-based recording ink composition according to claim 12, wherein said alkyl ether of a polyhydric alcohol is contained in an amount of from 1% by weight to 50% by weight based on the total weight of the ink composition.

22. The water-based recording ink composition according to claim 12, wherein said water is deionized water.

23. The water-based recording ink composition according to claim 12, wherein said polyhydric alcohol is contained in an amount greater than the content of the alkyl ether of a polyhydric alcohol.

24. An ink-jet recording process comprising jetting a water-based recording ink composition to a recording medium in the form of droplets to make a record; said ink composition comprising a dye, water, at least one of a polyhydric alcohol and an alkyl ether of a polyhydric alcohol, and an organic weakly basic compound, and having a pH range of 8 to 10, wherein said organic weakly basic compound is a 2-amino-1,3-propanediol derivative having no unsubstituted alkyl group at its 2 position.

25. The ink-jet recording process according to claim 24, wherein said water-based recording ink composition is jetted by utilizing the vibration of a piezoelectric device.

26. The ink-jet recording process according to claim 24, wherein said organic weakly basic compound is an alcohol amine derivative which is liquid at room temperature.

27. The ink-jet recording process according to claim 26, wherein said alcohol amine derivative is contained in an amount of from 0.03% to 2% by weight based on the total weight of the ink composition.

28. The ink-jet recording process according to claim 26, wherein said alcohol amine derivative which is liquid at room temperature is triethanolamine.

29. The ink-jet recording process according to claim 24, wherein said 2-amino-1,3-propanediol derivative is contained in an amount of from 0.03% to 2% by weight based on the total weight of the ink composition.

30. The ink-jet recording process according to claim 24, wherein said 2-amino-1,3-propanediol derivative is 2-aminomethyl-1,3-propanediol or 2-amino-2-hydroxymethyl-1,3-propanediol.

31. The ink-jet recording process according to claim 24, wherein said polyhydric alcohol is selected from the group consisting of polyethylene glycol, polypropylene glycol, ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-heptanediol, hexylene glycol, and glycerol.

32. The ink-jet recording process according to claim 24, wherein said alkyl ether of a polyhydric alcohol is selected from the group consisting of diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether.

33. The ink-jet recording process according to claim 24, wherein said polyhydric alcohol is contained in an amount of from 5% by weight to 95% by weight based on the total weight of the ink composition.

34. The ink-jet recording process according to claim 24, wherein said alkyl ether of a polyhydric alcohol is contained in an amount of from 1% by weight to 50% by weight based on the total weight of the ink composition.

35. The ink-jet recording process according to claim 24, wherein said water is deionized water.

36. The ink-jet recording process according to claim 24, wherein said water-based recording ink composition contains both of the polyhydric alcohol and the alkyl ether of a polyhydric alcohol.

37. The ink-jet recording process according to claim 36, wherein said polyhydric alcohol is contained in an amount greater than the content of the alkyl ether of a polyhydric alcohol.

38. The water-based recording ink composition according to claim 1, wherein said 2-amino-1,3-propanediol derivative has only polar group(s) at its 2 position.

39. The water-based recording ink composition according to claim 12, wherein said 2-amino-1,3-propanediol derivative has only polar group(s) at its 2 position.

40. The water-based recording ink composition according to claim 24, wherein said 2-amino-1,3-propanediol derivative has only polar group(s) at its 2 position.

* * * * *